Figure 1:
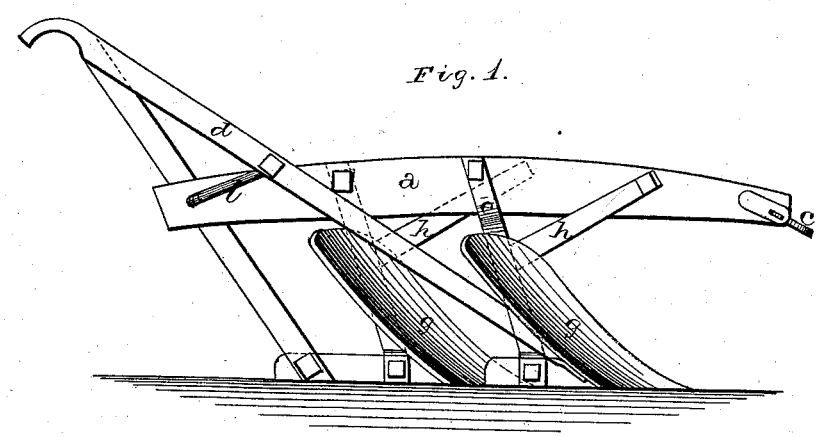
Figure 2:
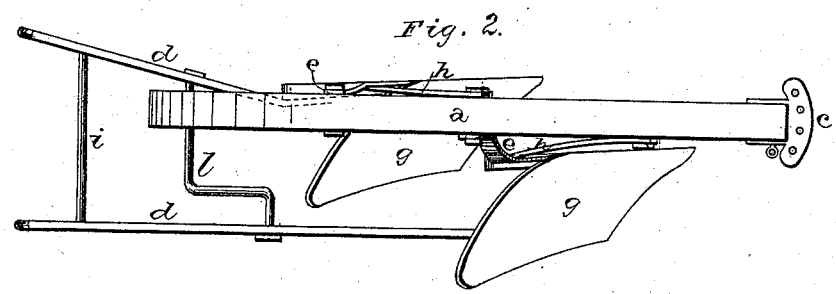

F. CHEVALIER.
PLOW.

No. 174,115. Patented Feb. 29, 1876.

WITNESSES.
J. Wm. Garner
F. M. Burnham

INVENTOR.
F. Chevalier
per
F. A. Lehmann, Atty.

UNITED STATES PATENT OFFICE.

FRANK CHEVALIER, OF FAYETTE COUNTY, KENTUCKY.

IMPROVEMENT IN PLOWS.

Specification forming part of Letters Patent No. 174,115, dated February 29, 1876; application filed January 31, 1876.

*To all whom it may concern:*

Be it known that I, FRANK CHEVALIER, in the county of Fayette and State of Kentucky, have invented certain new and useful Improvements in Plows; and I do hereby declare the following to be a full, clear, and exact description of the invention, such as will enable others skilled in the art to which it pertains to make and use it, reference being had to the accompanying drawings, which form part of this specification.

My invention relates to an improvement in plows; and it consists in the arrangement and combination of parts, that will be more fully described hereinafter, whereby a simple, cheap, and effective double plow is produced.

The accompanying drawings represent my invention.

$a$ represents the beam; $c$, an adjustable clevis; $d$, the two handles; $e$, the standards; and $g$, the plows.

The plows are placed one in the rear of the other, but have their standards secured to opposite sides of the beam $a$, and bent outward in opposite directions, as shown, so that the land-side of the front plow shall just about come on a line with the outer edge of the mold-board of the rear plow.

By this arrangement of the plows each one will cut its furrow independently of the other, and each one will lay over its furrow as perfectly as though the plow had been drawn along twice.

Each of the standards has its upper end bolted to one side of the beam, while the lower one is bolted to the land-side of its plow, and each standard is then strengthened by the brace $h$, the brace of the rear standard being fastened to the beam by the same bolt that fastens the front standard. Thus it will be seen that both plows can be removed from the beam by simply loosening three bolts.

One of the handles $d$ is bolted to the landside of the rear plow, while the other handle is inclined forward so as to be secured to the mold-board of the front one.

These handles are secured together by the straight round $i$, near their upper ends, and by the curved iron brace $l$ that passes through the end of the beam.

By means of these devices, both the handles and plows are rigidly braced together.

This plow is especially designed for cultivating corn and other products of the soil that are planted in rows, and as it throws a double furrow at the same time, it is only necessary to go once down and once up a furrow, and it is completed.

The plows being secured to opposite sides of the beam, the plow is evenly balanced, and runs smoothly and regular.

Having thus described my invention, I claim—

The combination of the two plows secured to the same beam, one in the rear of the other, with the two handles, one of which is attached to each plow, and secured together by the round $i$ and brace $l$, substantially as set forth.

In testimony that I claim the foregoing 1 have hereunto set my hand.

FRANK CHEVALIER.

Witnesses:
JOHN MCMURTRY,
GEO. W. DARNALL.